(12) United States Patent
Heidenfelder et al.

(10) Patent No.: US 7,199,181 B2
(45) Date of Patent: Apr. 3, 2007

(54) STABILISING COMPOSITION II

(75) Inventors: Thomas Heidenfelder, Dannstadt (DE); Manfred Appel, Landau (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 99 days.

(21) Appl. No.: 10/497,533

(22) PCT Filed: Dec. 13, 2002

(86) PCT No.: PCT/EP02/14234

§ 371 (c)(1),
(2), (4) Date: Jun. 10, 2004

(87) PCT Pub. No.: WO03/051972

PCT Pub. Date: Jun. 26, 2003

(65) Prior Publication Data

US 2005/0032944 A1     Feb. 10, 2005

(30) Foreign Application Priority Data

Dec. 14, 2001   (DE) ................ 101 61 864

(51) Int. Cl.
C08J 3/00   (2006.01)
C08K 5/34   (2006.01)
C08K 5/35   (2006.01)
C08K 5/15   (2006.01)
C08L 75/00   (2006.01)

(52) U.S. Cl. ............... 524/590; 252/380; 252/397; 252/399; 252/400.2; 252/400.24; 252/401; 252/404; 252/405; 252/407; 524/99; 524/102; 524/110; 524/126; 524/128; 524/287; 524/290; 524/323; 524/284; 524/288; 524/299; 524/316

(58) Field of Classification Search ........... 524/589, 524/590, 102, 110, 126, 128, 287, 290, 323, 524/284, 288, 299, 316, 99; 252/380, 397, 252/399, 400.2, 400.24, 401, 404, 405, 407

See application file for complete search history.

(56) References Cited

U.S. PATENT DOCUMENTS

| 4,524,165 A | 6/1985 | Musser et al. |
| 4,935,275 A | 6/1990 | Ushida et al. |
| 5,817,821 A | 10/1998 | Valet et al. |
| 5,821,292 A * | 10/1998 | Aumuller et al. ............ 524/291 |
| 5,869,565 A | 2/1999 | Clauss |
| 5,917,080 A | 6/1999 | Holder Baum et al. |
| 2002/0086743 A1* | 7/2002 | Bulpett et al. .............. 473/371 |

FOREIGN PATENT DOCUMENTS

| DE | 44 05 670 | 8/1995 |
| DE | 197 21 966 A1 | 12/1997 |
| DE | 199 48 117 | 4/2001 |
| EP | 263 524 | 4/1988 |
| EP | 0 389 419 A1 | 9/1990 |
| EP | 0 698 637 A2 | 2/1996 |
| EP | 1 024 165 A1 | 8/2000 |
| JP | 63-269751 | 11/1988 |
| JP | 2-300170 | 12/1990 |
| JP | 8-67813 | 3/1996 |
| JP | 10-81877 | 3/1998 |
| JP | 2002-159596 | 6/2002 |
| WO | WO 00/00540 | 1/2000 |

OTHER PUBLICATIONS

S.M. Andrews, et al. "Stabilization strategies for weatherable PU", Rubber World, vol. 216, No. 1, pp. 22-24 XP009008916 1997.

* cited by examiner

Primary Examiner—Patrick D. Niland
(74) Attorney, Agent, or Firm—Oblon, Spivak, McClelland, Maier & Neustadt, P.C.

(57) ABSTRACT

A stabilizer composition is described and comprises a 2-cyano-3,3-diarylacrylate, a sterically hindered monomeric amine, a sterically hindered phenol and, where appropriate, a chromane derivative and/or an organic phosphite and/or phosphonite. The stabilizer composition is particularly suitable for stabilizing thermoplastic polyurethane with respect to light, oxygen, and heat.

10 Claims, No Drawings

STABILISING COMPOSITION II

The present invention relates to a stabilizer composition and also to its use for stabilizing non-living organic material with respect to exposure to light, oxygen, and heat.

The mechanical, chemical, and/or esthetic properties of non-living organic material, in particular plastics and paints, are known to be impaired by exposure to light, oxygen, and heat. This impairment is usually apparent in the form of yellowing, discoloration, cracking, or embrittlement of the material. Stabilizers or stabilizer compositions are intended to give satisfactory protection from impairment of organic material by light, oxygen, and heat.

U.S. Pat. No. 5,917,080 describes 2-cyano-3,3-diphenylacrylates as effective light stabilizers for plastics and cosmetic products.

EP 0 263 524 relates to a stabilizer mixture made from chromane derivatives and from organic phosphites or phosphonites for stabilizing plastics, and this stabilizer mixture may, where appropriate, also comprise other stabilizers.

DE-A-4405670 relates to a stabilizer mixture made from chromane derivatives and from organic phosphites or phosphonites, and from amines, for stabilizing organic material.

DE 199 48 117 discloses a stabilizer composition which comprises a 3-arylacrylate, a sterically hindered amine, a chromane derivative, and an organic phosphite and/or phosphonite.

Low compatability with plastics, and also the low duration of protective action, are often still unsatisfactory in these stabilizers or stabilizer compositions. In addition, the plastics treated with the known stabilizer compositions have unsatisfactory colorfastness and gloss retention.

It is an object of the present invention to provide a novel stabilizer composition which provides long lasting protective action, in particular with regard to colorfastness and gloss retention, with respect to exposure to light, oxygen, and heat. The stabilizer composition is intended to be particularly effective in stabilizing polyurethanes.

We have found that this object is achieved by way of a stabilizer composition which comprises A) at least one 2-cyano-3,3-diarylacrylate of the formula I,

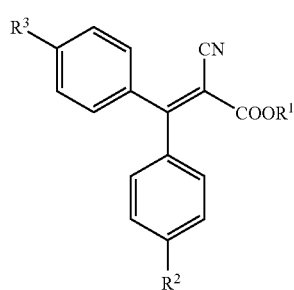

where
R$^1$ is C$_1$–C$_{18}$-alkyl which, where appropriate, may have interruption by one or more oxygen atoms, or is C$_3$–C$_8$-cycloalkyl, unsubstituted or substituted, and
R$^2$ and R$^3$, independently of one another, are hydrogen, C$_1$–C$_{12}$-alkyl, C$_1$–C$_{12}$-alkoxy or di(C$_1$–C$_4$-alkylamino), B) at least one amine of the formula II

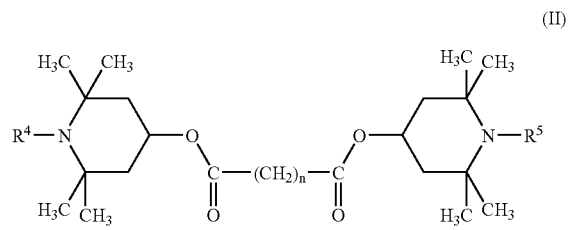

where
R$^4$ and R$^5$, independently of one another, are hydrogen, C$_1$–C$_4$-alkyl, or C$_1$–C$_{12}$-alkoxy, and
n is an integer from 2 to 10, C) at least one phenol of the formula III

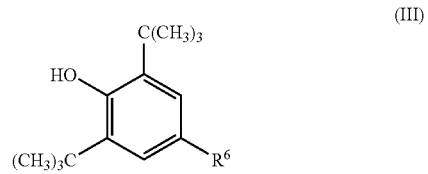

where
R$^6$ is C$_1$–C$_{20}$-alkoxycarbonyl-C$_1$–C$_6$-alkyl,

D) where appropriate, at least one chromane derivative of the formula IV

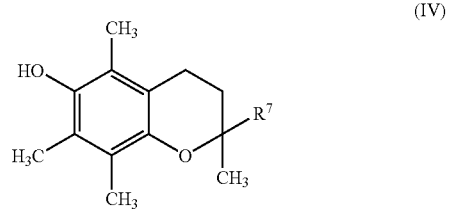

where R$^7$ is a group of the formula

—(CH$_2$)$_3$—CH—(CH$_2$)$_3$—CH—(CH$_2$)$_3$—CH—CH$_3$,
         |             |            |
         CH$_3$        CH$_3$       CH$_3$

—CH$_2$—CH$_2$—O—C(=O)—(C$_7$–C$_{30}$–alkyl),

—CH$_2$CH$_2$—S—(C$_1$–C$_{30}$–alkyl), or

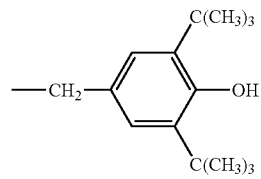

and

E) where appropriate, at least one organic phosphite and/or phosphonite.

At room temperature, the stabilizer composition of the invention is generally a viscous liquid, and its incorporation into the material to be stabilized, and its homogeneous distribution therein, are therefore easy.

It has also been found that the protective action of the stabilizer composition of the invention with respect to exposure to light, oxygen, and heat is higher than would be expected from the contributions of the components of the stabilizer composition. The well-developed protective action provided by the stabilizer composition of the invention is therefore based on a synergistic effect of the components.

As component A), the stabilizer composition of the invention encompasses a 2-cyano-3,3-diarylacrylate of the formula I

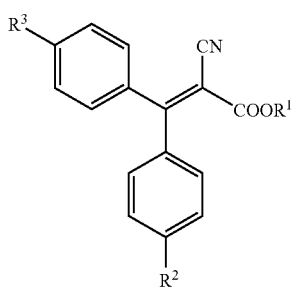

(I)

where $R^1$ is $C_1-C_{18}$-alkyl, preferably $C_4-C_{18}$-alkyl, which, where appropriate, may have interruption by one or more oxygen atoms, or is $C_3-C_8$-cycloalkyl, unsubstituted or substituted, and $R^2$ and $R^3$, independently of one another, are hydrogen, $C_1-C_{12}$-alkyl, $C_1-C_{12}$-alkoxy or di($C_1-C_4$-alkylamino).

$R^1$ in formula I may be a straight-chain or branched $C_1-C_{18}$-alkyl group, such as methyl, ethyl, n-propyl, isopropyl, n-butyl, sec-butyl, isobutyl, tert-butyl, n-pentyl, isopentyl, sec-pentyl, tert-pentyl, neopentyl, n-hexyl, n-heptyl, n-octyl, 2-ethylhexyl, n-nonyl, isononyl, n-decyl, n-undecyl, n-dodecyl, n-tridecyl, isotridecyl, n-tetradecyl, n-hexadecyl, n-octadecyl. Among these, particular preference is given to 2-ethylhexyl and n-octyl. Other preferred meanings of $R^1$ are polyoxyethylene radicals, such as —CH₂—CH₂—O—CH₂CH₃, —CH₂—CH₂—O—CH₂—CH₂—O—CH₂CH₃, and also longer-chain homologs.

$R^1$ may also be $C_3-C_8$-cycloalkyl, such as cyclopropyl, cyclobutyl, cyclopentyl, cyclohexyl, cycloheptyl, or cyclooctyl. Preference is given to $C_5-C_8$-cycloalkyl, such as cyclopentyl, cyclohexyl, cycloheptyl, and cyclooctyl, particularly cyclopentyl and cyclohexyl.

Where appropriate, $R^1$ may have substitution by one, two, or three radicals selected from the group consisting of halogen, e.g. fluorine, chlorine or bromine, cyano, nitro, amino, $C_1-C_4$-alkylamino, $C_1-C_4$-dialkylamino, hydroxy, $C_1-C_4$-alkyl, and $C_1-C_4$-alkoxy.

$R^2$ and $R^3$ are preferably, independently of one another, hydrogen, $C_1-C_4$-alkyl, $C_1-C_4$-alkoxy or di($C_1-C_4$-alkyl)amino, particularly preferably methyl, ethyl, methoxy, ethoxy, or dimethylamino, in particular hydrogen.

2-Ethylhexyl 2-cyano-3,3-diphenylacrylate is particularly preferred as 2-cyano-3,3-diarylacrylate of the formula I.

As component B), the stabilizer composition of the invention comprises at least one sterically hindered monomeric amine. Sterically hindered amines (Hindered Amine Light Stabilizers; HALS) are known stabilizers with respect to photolytic and thermal decomposition of plastics. Suitable compounds for this purpose are amines of the formula II

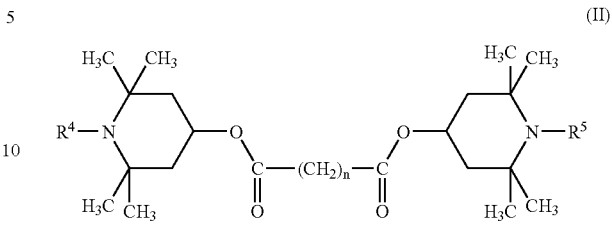

(II)

where $R^4$ and $R^5$, independently of one another, are hydrogen, $C_1-C_4$-alkyl or $C_1-C_{12}$-alkoxy, and n is an integer from 2 to 10, preferably 2 to 8, in particular 8.

Each of $R^4$ and $R^5$ is hydrogen, a straight-chain or branched $C_1-C_4$-alkyl group, such as methyl, ethyl, n-propyl, isopropyl, n-butyl, isobutyl, sec-butyl, tert-butyl, or a straight-chain or branched $C_1-C_{12}$-alkoxy group, such as methoxy, ethoxy, n-propoxy, isopropoxy, n-butoxy, isobutoxy, sec-butoxy, tert-butoxy, n-pentyloxy, n-hexyloxy, iso-hexyloxy, n-octyloxy, 2-ethylhexyloxy, iso-octyloxy, n-nonyloxy, n-decyloxy, n-undecyloxy, or n-dodecyloxy. Particularly preferred groups among these are hydrogen, methyl, and the isomeric octyloxy groups.

The compounds which may be used as component B) may be liquid or crystalline products. Particularly suitable compounds are bis-(1,2,2,6,6-pentamethylpiperidin-4-yl) sebacate, commercially available with the name Lowilite® 76 from the company Great Lakes, bis-(2,2,6,6-tetramethylpiperidin-4-yl) sebacate, commercially available with the name Lowilite® 77 from the company Great Lakes, bis-(2,2,6,6-tetramethylpiperidin-4-yl) succinate, commercially available with the name Tinuvin® 780 FF from the company Ciba-Geigy, bis-(1-octyloxy-2,2,6,6-tetramethylpiperidin-4-yl) sebacate, commercially available with the name Tinuvin® 123 from the company Ciba-Geigy. Use is particularly made of sterically hindered monomeric amines which at room temperature or below 100° C. are liquid, an example being bis-(1,2,2,6,6-penta-methylpiperidin-4-yl) sebacate.

As component C), the stabilizer composition of the invention comprises at least one phenol of the formula III

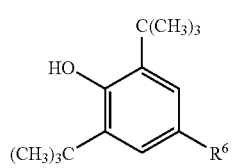

(III)

where $R^6$ is $C_1-C_{20}$-alkoxycarbonyl-$C_1-C_6$-alkyl, preferably $C_1-C_{20}$-alkoxycarbonyl-$C_1-C_4$-alkyl.

Particularly suitable compounds for this purpose are (3,5-di-tert-butyl-4-hydroxyphenyl)propionates of $C_1-C_{20}$-alkanols, for example isooctyl 3-(3,5-di-tert-butyl-4-hydroxyphenyl)propionate, commercially available with the name Irganox® 1135 from the company Ciba-Geigy, or n-octadecyl 3-(3,5-di-tert-butyl-4-hydroxyphenyl)-propionate, commercially available with the name Irganox® 1076 from the company Ciba-Geigy.

As component D), the stabilizer composition of the invention optionally also comprises at least one chromane derivative of the formula IV

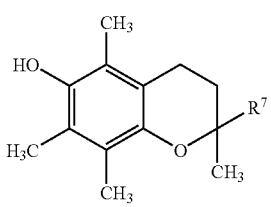

where $R^7$ is a group of the formula

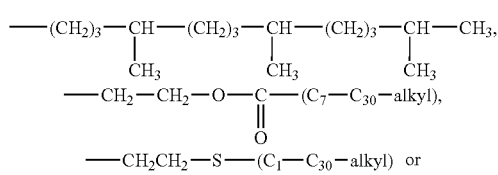

-continued

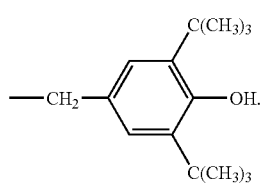

Particularly suitable compounds for this purpose are 2,5,7,8-tetramethyl-2-(2'-stearoyloxyethyl)chromane ($R^7$= $CH_2$—$CH_2$—O—CO—$C_{17}H_{35}$), and in particular α-tocopherols, preferably D,L-α-tocopherol ($R^7$=—$(CH_2)_3$—CH($CH_3$)—$(CH_2)_3$—CH($CH_3$)—$(CH_2)_3$—C($CH_3$)$_2$).

As component E), the stabilizer composition of the invention optionally also comprises an organic phosphite and/or phosphonite.

Particularly suitable compounds for this purpose are organic phosphites of the formula V

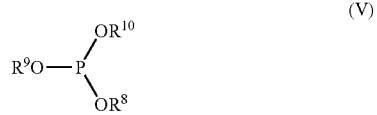

where each of the radicals $R^8$ to $R^{10}$ is $C_2$–$C_{12}$-alkyl, preferably $C_6$–$C_{11}$-alkyl, in particular $C_8$–$C_{10}$-alkyl, or $C_6$–$C_{18}$-aryl, phenyl, which may have substitution by $C_1$–$C_{18}$-alkyl groups, preferably by from one to three $C_4$–$C_{12}$-alkyl groups, or an organic phosphonite of the formula VI

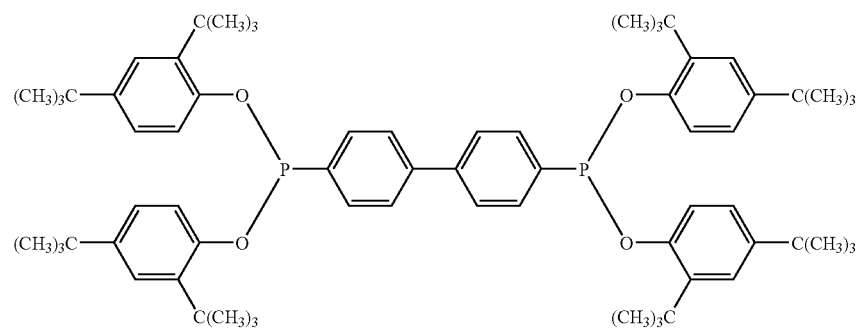

or a mixture made from the phosphites V and the phosphonite VI.

The phosphites and phosphonites which may be used according to the invention may be either liquid or crystalline. Examples which may be mentioned of phosphites of the formula V are:

trialkyl phosphites having preferably long-chain linear or branched alkyl groups, such as octyl, nonyl, isononyl, decyl or isodecyl groups; preferably tris(nonylphenyl) phosphite;

triarylphosphites having unsubstituted aryl groups or having aryl groups mono- to trisubstituted by alkyl, examples being phenyl, nonylphenyl, or 2,4-di-tert-butylphenyl groups;

mixed aryl alkyl phosphites, such as diisodecyl phenyl phosphite or diphenyl pentaerythritol diphosphite.

The phosphonite of the formula VI is available commercially with the name Irgafos® P-EPQ from the company Ciba-Geigy.

In one particularly preferred embodiment, the stabilizer composition of the invention comprises the optional components D) and E). The mixing ratio D):E) is preferably in the range from 1:5 to 1:14, preferably from 1:7 to 1:12.

The stabilizer composition of the invention also optionally comprises at least one other light stabilizer which absorbs radiated light in the UV-A (320–400 nm) and/or UV-B (280–320 nm) region. Of course, the additional light stabilizers have to be compatible with the stabilizer composition, and preferably colorless in the visible region. Examples which may be mentioned of UV absorbers of this type are: 2-hydroxybenzophenones, 2-hydroxyphenylbenzotriazoles, oxanilides, 2-hydroxyphenyl-triazines, 4,4'-diarylbutadienes.

Examples of suitable 2-hydroxybenzophenones, of which a wide variety is commercially available, are: 2-hydroxy-4-methoxy-benzophenone, 2,4-dihydroxybenzophenone, 2-hydroxy-4-dodecoxy-benzophenone, 2,2'-dihydroxy-4-methoxybenzophenone (trade name Cyasorb® UV 24, American Cyanamid), 2,2'-dihydroxy-4,4'-di-methoxybenzophenone, 2,2',4,4'-tetrahydroxybenzophenone. The 2-hydroxybenzophenones feature good UV resistance and high absorptive power.

Examples of suitable 2-hydroxyphenylbenzotriazoles are 2-(2'-hydroxy-5'-methylphenyl)benzotriazole (trade name Tinuvin® P, Ciba-Geigy), 2-(2'-hydroxy-5'-tert-octylphenyl)-benzotriazole (trade name Cyasorb® UV 5411), 2-(2'-hydroxy-3'-tert-butyl-5'-methylphenyl)benzotriazole (trade name Tinuvin® 326, Ciba-Geigy), 2-(2'-hydroxy-3',5'-di-tert-butylphenyl)-5-chlorobenzotriazole (trade name Tinuvin® 327, Ciba-Geigy). 2-Hydroxyphenylbenzotriazoles absorb at the limit of the visible region and do not exhibit any yellow coloration.

An example of a suitable 2-hydroxyphenyltriazine is 2,4-bis-(2', 2''',4',4''-tetramethylphenyl)-6-(2''''-hydroxy-4''''-octyloxy-phenyl)-1,3,5-triazine (trade name Cyasorb® 1164, American Cyanamid).

Examples of preferred oxanilides are:

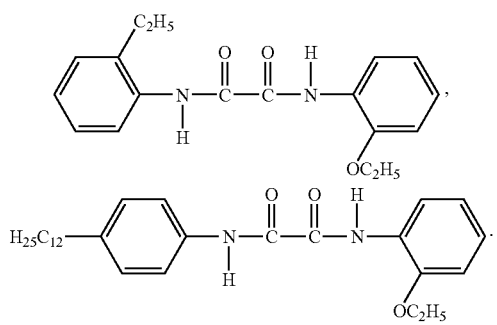

4,4'-Diarylbutadienes of the formula VII

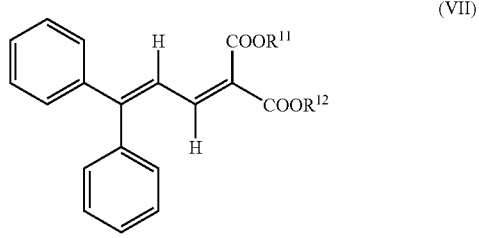

(VII)

are known from EPA 916 335. The substituents $R^{11}$ and/or $R^{12}$ are preferably $C_1$–$C_8$-alkyl and $C_5$–$C_8$-cycloalkyl.

The form of the stabilizer composition may vary depending on the application. The content of component B) may be up to 50% by weight. If the optional components D and E are absent in the stabilizer composition, it generally comprises:

from 45 to 70 parts by weight, preferably from 55 to 65 parts by weight, of A), from 20 to 50 parts by weight, preferably from 25 to 35 parts by weight, of B), and from 5 to 15 parts by weight, preferably from 7 to 12 parts by weight, of C).

If concomitant use is made of components D) and E), the stabilizer composition of the invention generally comprises:

from 30 to 50 parts by weight, preferably from 35 to 45 parts by weight, of A), from 30 to 50 parts by weight, preferably from 35 to 45 parts by weight, of B), from 5 to 15 parts by weight, preferably from 7 to 12 parts by weight, of C), from 0.5 to 1.5 parts by weight, preferably from 0.7 to 1.2 parts by weight, of D) and from 5 to 15 parts by weight, preferably from 7 to 15 parts by weight, of E).

If concomitant use is made of another light stabilizer, its amount used is preferably from 0.1 to 15 parts by weight, preferably from 1 to 12 parts by weight, based on the total weight of the stabilizer composition.

The concentration of the stabilizer composition of the invention added to the organic material to be stabilized, prior to, during, or after its preparation, is generally from 0.01 to 5% by weight, preferably from 0.01 to 2% by weight, in particular from 0.05 to 1% by weight, based on the organic material.

Examples of non-living organic material are cosmetic preparations, such as ointments and lotions, pharmaceutical formulations, such as pills and suppositories, photographic recording materials, in particular photographic emulsions, precursors of plastics and paints, and in particular the actual paints and plastics themselves.

Examples which may be mentioned of plastics which can be stabilized by the stabilizer mixture of the invention are:

polymers of mono- or diolefins, e.g. low- or high-density polyethylene, and polypropylene, linear poly-1-butene, polyisoprene, polybutadiene, and also copolymers of mono- or diolefins, and mixtures of the polymers mentioned;

polystyrene, and also copolymers of styrene or α-methylstyrene with dienes and/or with acrylic derivatives, e.g. styrene-butadiene, styrene-acrylonitrile (SAN), styrene-ethyl methacrylate, styrene-butadiene-ethyl acrylate, styrene-acrylonitrile-methacrylate, acrylonitrile-butadiene-styrene (ABS), and methyl methacrylate-butadiene-styrene (MBS);

halogen-containing polymers, e.g. polyvinyl chloride, polyvinyl fluoride, polyvinylidene fluoride and also copolymers of these;

polymers which derive from α,β-unsaturated acids or from derivatives of these, for example polyacrylates, polymethacrylates, polyacrylamides, and polyacrylonitriles;

polymers which derive from unsaturated alcohols and amines or from their acid derivatives or acetals, e.g. polyvinyl alcohol and polyvinyl acetate;

polyurethanes, polyamides, polyureas, polyphenylene ethers, polyesters, polycarbonates, polysulfones, polyether sulfones, and polyether ketones.

The paints which may be stabilized using the stabilizer composition of the invention include paints such as alkyd resin paints, emulsion paints, epoxy resin paints, polyurethane paints, acrylic resin paints, cellulose nitrate paints, and varnishes, such as wood-protection varnishes.

The stabilizer composition of the invention is particularly suitable for stabilizing polyurethanes, in particular thermoplastic polyurethanes. These are mainly linear polyurethanes which are obtained from diisocyanates, such as 4,4'-diisocyanatodiphenylmethane, and from long-chain diols, such as polytetrahydrofuran or polyester polyols. The starting material used is generally appropriate prepolymers, and short-chain diols or diamines are used as chain extenders. The resultant products have a segmented structure, examples of molecular weights of the soft segments being from 1 000 to 3 000, these being crosslinked physically by the hard segments.

The stabilizer composition of the invention may also be prepared in the form of a masterbatch, for example one which comprises a concentration of from 2.5 to 25% by weight of the composition, the masterbatch being added to the materials to be stabilized.

The materials stabilized using the stabilizer composition of the invention exhibit particular quality features with regard to color change and gloss retention when compared with materials stabilized with the comparative composition, i.e. their impairment by external effects is delayed. There should be a maximum of retention of gloss and color during entire service life, and loss of these always means loss of quality. The materials stabilized according to the invention therefore feature a prolonged service time.

The examples below give further illustration of the invention.

I. DESCRIPTION OF TEST METHODS

1. Determination of Gardner Gloss Level

Gloss is measured using a Gardner Micro-Gloss 60° reflectometer to DIN 67530.

2. Determination of Color Difference

Prior to and after weathering, the CIELAB color differences ΔE were calculated for each specimen from the tristimulus values with the aid of the color difference formula. The CIE tristimulus values X, Y, and Z were determined for the specimens using the DataColor color-measurement device from Datacolor.

II. EXAMPLES

Example 1

A stabilizer composition 1 was prepared from:
60 parts by weight of 2-ethylhexyl 2-cyano-3,3-diphenylacrylate,
30 parts by weight of bis-(1,2,2,6,6-pentamethyl-piperidin-4-yl) sebacate, and
10 parts by weight of isooctyl 3-(3,5-di-tert-butyl-4-hydroxyphenyl)propionate.

Example 2

A stabilizer composition 2 was prepared from:
40 parts by weight of 2-ethylhexyl 2-cyano-3,3-diphenylacrylate,
40 parts by weight of bis-(1,2,2,6,6-pentamethyl-piperidin-4-yl) sebacate,
10 parts by weight of isooctyl 3-(3,5-di-tert-butyl-4-hydroxyphenyl)propionate, and
10 parts by weight of a mixture made from 1 part by weight of α-tocopherol and 10 parts by weight of tris(nonylphenyl) phosphite.

The comparison used was a commercially available stabilizer composition whose makeup was as follows:
60 parts by weight of 2-ethylhexyl p-methoxycinnamate,
20 parts by weight of bis(1,2,2,6,6-pentamethyl-piperidin-4-yl) sebacate, and
20 parts by weight of a mixture made from 1 part by weight of α-tocopherol and 10 parts by weight of tris(nonylphenyl) phosphite.

III. TESTING OF STABILIZER ACTION

The stabilizer was added to a TPU reaction, and the samples here were produced by casting.

1% by weight of the stabilizer composition of example 1 was incorporated into one specimen, and 1% by weight of the stabilizer composition of example 2 was incorporated into another specimen. The comparison used was a specimen into which 1% by weight of the stabilizer composition of the comparative example has been incorporated. Since rapid yellowing occurred under the test conditions in the case of the unstabilized specimen, it was not possible to use the unstabilized specimen to carry out a control test.

Test specimens were weathered using a Weather-Ometer® accelerated weathering device from the company Atlas Materials Testing Technology B.V., the Netherlands. Gardner gloss (table 1) and color change (table 2) were determined as a function of weathering time. The results are given in tables 1 and 2 below.

TABLE 1

| Gardner gloss as a function of time | | | | |
|---|---|---|---|---|
| | 0 [h] | 500 [h] | 1000 [h] | 1500 [h] |
| Comparison | 27 | 38 | 40 | 30 |
| Example 2 | 38 | 35 | 37 | 35 |

In relation to gloss level, the specimen stabilized with the stabilizer composition 2 of the invention exhibited a particular advantage over the specimen stabilized using the comparative composition after prolonged weathering.

TABLE 2

| Color difference ΔE – CIE as a function of time | | | |
|---|---|---|---|
| | 200 [h] | 400 [h] | 600 [h] |
| Comparison | 4.3 | 5.4 | 3.9 |
| Example 1 | 4.2 | 2.3 | 1.2 |
| Example 2 | 4.5 | 4.6 | 2.6 |

As can be seen from table 2, the specimens stabilized using the stabilizer compositions of the invention exhibited markedly less color change than the specimen stabilized using the comparative composition.

What is claimed is:

1. A method for stabilizing polyurethane from exposure to light, oxygen, and/or heat, which comprises:
   incorporating a stabilizing composition into polyurethane;
   said stabilizing composition comprising:
   A) at least one 2-cyano-3,3-diarylacrylate of the formula I,

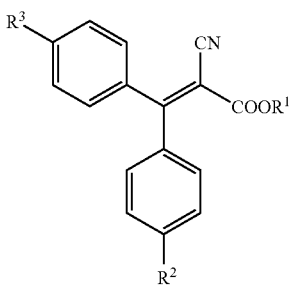

wherein
R$^1$ is C$_1$–C$_{18}$-alkyl, and
R$^2$ and R$^3$, independently of one another, are hydrogen;
B) at least one amine of the formula II

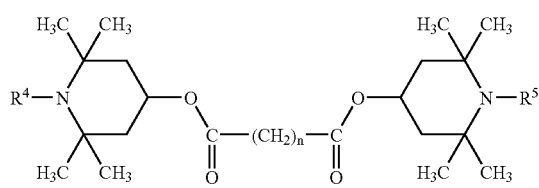

wherein
R$^4$ and R$^5$, independently of one another, are hydrogen, or C$_1$–C$_4$-alkyl, and
n is an integer from 2 to 10,
C) at least one phenol of the formula III

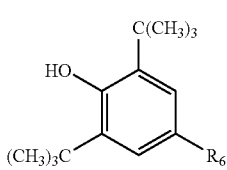

wherein
R$^6$ is C$_1$–C$_{20}$-alkoxycarbonyl-C$_1$–C$_4$-alkyl,
D) optionally, at least one chromane derivative of the formula IV

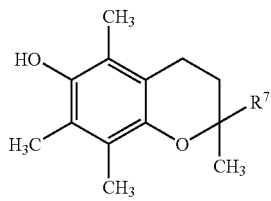

where R$^7$ a group of the formula

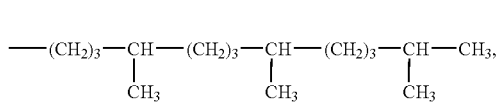

and
E) optionally, at least one organic phosphite of the formula V

wherein each of the radicals R$^8$ to R$^{10}$ is phenyl, optionally substituted with at least one C$_1$–C$_{18}$-alkyl group.

2. A method as claimed in claim 1, wherein component A) is 2-ethylhexyl 2-cyano-3,3-diphenylacrylate.

3. A method as claimed in claim 1, wherein component B) is bis-(1,2,2,6,6-pentamethylpiperidin-4-yl)sebacate.

4. A method as claimed in claim 2, wherein component B) is bis-(1,2,2,6,6-pentamethylpiperidin-4-yl)sebacate.

5. A method as claimed in claim 1, wherein component C) is isooctyl 3-(3,5-di-tert-butyl-4-hydroxyphenyl)propionate.

6. A method as claimed in claim 1, wherein component D) is α-tocopherol.

7. A method as claimed in claim 1, wherein component E) is tris(nonylphenyl) phosphite.

8. A method as claimed in claim 1, wherein the polyurethane is a thermoplastic polyurethane.

9. A thermoplastic polyurethane, comprising:
   A) at least one 2-cyano-3,3-diarylacrylate of the formula I,

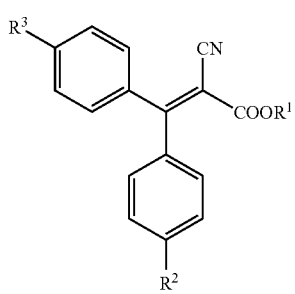

wherein

R$^1$ is C$_1$–C$_{18}$alkyl which, optionally, may have interruption by one or more oxygen atoms, or is C$_3$–C$_8$-cycloalkyl, unsubstituted or substituted, and R$^2$ and R$^3$, independently of one another, are hydrogen, C$_1$–C$_{12}$-alkyl, C$_1$–C$_{12}$-alkoxy or di(C$_1$–C$_4$-alkylamino);

B) at least one amine of the formula II

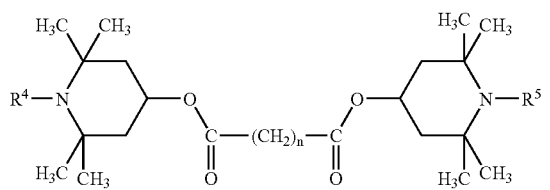

(II)

wherein

R$^4$ and R$^5$, independently of one another, are hydrogen, C$_1$–C$_4$-alkyl, or C$_1$–C$_{12}$-alkoxy, and n is an integer from 2 to 10, C) at least one phenol of the formula III

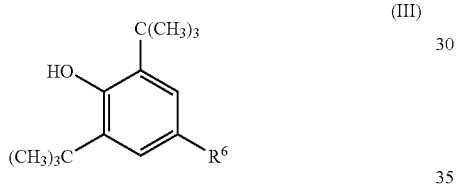

(III)

wherein

R$^6$ is C$_1$–C$_{20}$-alkoxycarbonyl-C$_1$–C$_6$-alkyl,

D) optionally, at least one chromane derivative of the formula IV

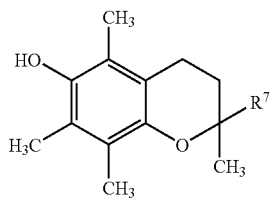

(IV)

where R$^7$ is a group of the formula

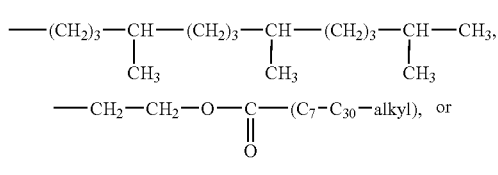

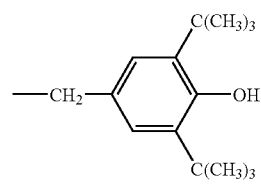

and

E) optionally, at least one organic phosphite and/or phosphonite.

10. A method as claimed in claim 1, wherein each of the radicals R$^8$ to R$^{10}$ in formula V is phenyl, optionally substituted by one to three C$_4$–C$_{12}$-alkyl groups.

* * * * *